(12) United States Patent
Turgeman

(10) Patent No.: US 9,071,969 B2
(45) Date of Patent: *Jun. 30, 2015

(54) SYSTEM, DEVICE, AND METHOD OF DETECTING IDENTITY OF A USER OF AN ELECTRONIC DEVICE

(71) Applicant: Avi Turgeman, Cambridge, MA (US)

(72) Inventor: Avi Turgeman, Cambridge, MA (US)

(73) Assignee: BioCatch Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/566,723

(22) Filed: Dec. 11, 2014

(65) Prior Publication Data

US 2015/0094030 A1    Apr. 2, 2015

Related U.S. Application Data

(63) Continuation of application No. 13/922,271, filed on Jun. 20, 2013, now Pat. No. 8,938,787, which is a continuation-in-part of application No. 13/877,676, filed as application No. PCT/IL2011/000907 on Nov. 29, 2011.

(60) Provisional application No. 61/417,479, filed on Nov. 29, 2010.

(51) Int. Cl.
| | |
|---|---|
| *H04W 12/06* | (2009.01) |
| *G06F 21/55* | (2013.01) |
| *G06F 21/32* | (2013.01) |
| *G06F 21/31* | (2013.01) |
| *G06F 3/041* | (2006.01) |
| *H04M 1/725* | (2006.01) |

(52) U.S. Cl.
CPC .............. *H04W 12/06* (2013.01); *G06F 21/554* (2013.01); *G06F 21/32* (2013.01); *G06F 21/31* (2013.01); *G06F 3/041* (2013.01); *H04M 1/72522* (2013.01)

(58) Field of Classification Search
CPC ....... G06F 21/31; G06F 21/316; G06F 21/32; G06F 2221/2133; G06F 21/554
USPC .......................................... 726/7, 19; 455/441
See application file for complete search history.

(56) References Cited

U.S. PATENT DOCUMENTS

| | | | | |
|---|---|---|---|---|
| 3,699,517 | A * | 10/1972 | Dyche ........................... | 382/122 |
| 3,983,535 | A * | 9/1976 | Herbst et al. .................. | 382/122 |
| 4,128,829 | A * | 12/1978 | Herbst et al. .................. | 382/120 |
| 4,621,334 | A * | 11/1986 | Garcia .......................... | 382/115 |
| 4,805,222 | A * | 2/1989 | Young et al. ................... | 382/115 |

(Continued)

*Primary Examiner* — Kambiz Zand
*Assistant Examiner* — Tongoc Tran
(74) *Attorney, Agent, or Firm* — Eitan, Mehulal & Sadot

(57) ABSTRACT

A method for confirming identity of a user of a mobile electronic device, the method including: receiving touch data from a touch-screen of the mobile electronic device; receiving acceleration data from an accelerometer of the mobile electronic device; correlating between the touch data and the acceleration data; based on the correlating, generating a user-specific trait indicative of said user. The method further includes storing a reference value of the user-specific trait, indicative of said user; in a subsequent usage session of the mobile electronic device, generating a current value of the user-specific trait correlating between touch data and acceleration data; and based on a comparison between the current value of the user-specific trait and the reference value of the user-specific trait, determining whether or not a current user of the mobile electronic device is an authorized user of the mobile electronic device.

25 Claims, 5 Drawing Sheets

(56) References Cited

U.S. PATENT DOCUMENTS

| | | | |
|---|---|---|---|
| 5,485,171 A * | 1/1996 | Copper et al. | 345/160 |
| 5,557,686 A * | 9/1996 | Brown et al. | 382/115 |
| 5,838,306 A * | 11/1998 | O'Connor et al. | 345/163 |
| 5,874,941 A * | 2/1999 | Yamada | 345/157 |
| 6,337,919 B1 * | 1/2002 | Dunton | 382/124 |
| 6,572,014 B1 * | 6/2003 | Lambert | 235/380 |
| 7,139,916 B2 * | 11/2006 | Billingsley et al. | 713/182 |
| 7,818,290 B2 * | 10/2010 | Davis et al. | 707/603 |
| 8,433,785 B2 * | 4/2013 | Awadallah et al. | 709/224 |
| 2003/0033526 A1 * | 2/2003 | French et al. | 713/168 |
| 2005/0008148 A1 * | 1/2005 | Jacobson | 380/26 |
| 2006/0215886 A1 * | 9/2006 | Black | 382/124 |
| 2007/0214426 A1 * | 9/2007 | Ruelle et al. | 715/767 |
| 2007/0255821 A1 * | 11/2007 | Ge et al. | 709/224 |
| 2007/0266305 A1 * | 11/2007 | Cong et al. | 715/500.1 |
| 2007/0283416 A1 * | 12/2007 | Renaud | 726/2 |
| 2008/0091639 A1 * | 4/2008 | Davis et al. | 707/1 |
| 2008/0301808 A1 * | 12/2008 | Calo et al. | 726/23 |
| 2009/0094311 A1 * | 4/2009 | Awadallah et al. | 709/202 |
| 2010/0077470 A1 * | 3/2010 | Kozat et al. | 726/11 |
| 2010/0328074 A1 * | 12/2010 | Johnson et al. | 340/573.1 |
| 2011/0012829 A1 * | 1/2011 | Yao | 345/157 |
| 2011/0016320 A1 * | 1/2011 | Bergsten et al. | 713/170 |
| 2011/0063211 A1 * | 3/2011 | Hoerl et al. | 345/157 |
| 2011/0102570 A1 * | 5/2011 | Wilf et al. | 348/77 |
| 2011/0113388 A1 * | 5/2011 | Eisen et al. | 715/856 |
| 2011/0154273 A1 * | 6/2011 | Aburada et al. | 716/52 |
| 2011/0191820 A1 * | 8/2011 | Ivey | 726/3 |
| 2011/0193737 A1 * | 8/2011 | Chiueh | 341/176 |
| 2011/0202453 A1 * | 8/2011 | Issa et al. | 705/39 |
| 2011/0246902 A1 * | 10/2011 | Tsai et al. | 715/740 |
| 2012/0133055 A1 * | 5/2012 | Machida | 257/777 |
| 2013/0133055 A1 * | 5/2013 | Ali et al. | 726/7 |

* cited by examiner

SYSTEM, DEVICE, AND METHOD OF DETECTING IDENTITY OF A USER OF AN ELECTRONIC DEVICE

CROSS-REFERENCE TO RELATED APPLICATIONS

The present application is a Continuation of U.S. patent application Ser. No. 13/922,271, filed on Jun. 20, 2013, titled "System, Device, and Method of Detecting Identity of a User of a Mobile Electronic Device"; which is a Continuation-In-Part (CIP) of U.S. patent application Ser. No. 13/877,676, titled "Method and Device for Confirming Computer End-User Identity", filed on Apr. 4, 2013; which is a National Phase filing of PCT International Application number PCT/IL2011/000907, titled "Method and Device for Confirming Computer End-User Identity", filed on Nov. 29, 2011, published as International Publication number WO/2012/073233; which claims priority and benefit from U.S. provisional patent application No. 61/417,479, titled "Biological and Behavioral Authentication Method and System", filed on Nov. 29, 2010; and all of the above-mentioned patent applications are hereby incorporated by reference in their entirety.

FIELD

The present invention is related to the security of electronic devices and systems.

BACKGROUND

Millions of people around the world utilize mobile electronic devices, such as smartphones and tablets, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for detecting identity of a user of a mobile electronic device, and for determining that a mobile electronic device is used by a fraudulent user.

In accordance with the present invention, for example, a method for confirming identity of a user of a mobile electronic device may comprise: receiving touch data from a touch-screen of the mobile electronic device; receiving acceleration data from an accelerometer of the mobile electronic device; correlating between the touch data and the acceleration data; based on the correlating, generating a user-specific trait indicative of said user.

In accordance with the present invention, for example, the method may comprise: storing a reference value of the user-specific trait, indicative of said user; in a subsequent usage session of the mobile electronic device, generating a current value of the user-specific trait correlating between touch data and acceleration data; and based on a comparison between the current value of the user-specific trait and the reference value of the user-specific trait, determining whether or not a current user of the mobile electronic device is an authorized user of the mobile electronic device.

In accordance with the present invention, for example, storing comprises: storing within said mobile electronic device; and said comparison is performed within said mobile electronic device.

In accordance with the present invention, for example, storing comprises storing externally to said mobile electronic device; and said comparison is performed externally to said mobile electronic device, and comprises wirelessly receiving at the mobile electronic device an indication of said comparison.

In accordance with the present invention, for example, said touch data comprises non-tactile touch data indicating a hovering user gesture in proximity to said touch-screen.

In accordance with the present invention, for example, the method may comprise: receiving gyroscope data from a gyroscope of the mobile electronic device; correlating between the touch data and the gyroscope data; based on the correlating between the touch data and the gyroscope data, generating another user-specific trait indicative of said user.

In accordance with the present invention, for example, the method may comprise: capturing non-tactile motion data indicating a user gesture; correlating between the non-tactile motion data and the acceleration data; based on the correlating between the non-tactile motion data and the acceleration data, generating another user-specific trait indicative of said user.

In accordance with the present invention, for example, the method may comprise: comparing between (a) a currently-calculated value of the user-specific trait, corresponding to a current usage of the mobile electronic device, and (b) a previously-calculated value of the user-specific trait, corresponding to a previous usage of the mobile electronic device; and based on a comparison result, performing at least one of: restricting access of said user to an online service; restricting access of said user to an application installed on said mobile electronic device; requiring the user to authenticate his identity to an online service; requiring the user to authenticate his identity to an application installed on said mobile electronic device.

In accordance with the present invention, for example, the method may comprise: based on said touch data, estimating user-specific motor control parameters and user-specific motor control noise; and based on the estimated user-specific motor control parameters and user-specific motor control noise, differentiating between said user and another user.

In accordance with the present invention, for example, the method may comprise: based on said touch data, estimating user-specific motor control parameters and user-specific motor control noise of a control loop which comprises translation error and gesture velocity error; and based on the estimated user-specific motor control parameters and user-specific motor control noise, differentiating between said user and another user.

In accordance with the present invention, for example, the method may comprise: based on said correlating, estimating a user-specific physiological trait of said user; and based on the user-specific physiological trait, differentiating between said user and another user.

In accordance with the present invention, for example, estimating the user-specific physiological trait of said user comprises at least one of: estimating a length of a finger of the user; estimating a width of a finger of the user; estimating a size-related parameter of a finger of the user; estimating a distance between a tip of a finger of the user and another part of a hand of the user.

In accordance with the present invention, for example, the method may comprise: based on said correlating, estimating a user-specific behavioral trait of said user; and based on the user-specific behavioral trait, differentiating between said user and another user.

In accordance with the present invention, for example, estimating the user-specific behavioral trait of said user comprises: determining that said user typically performs a particular inadvertent gesture while performing a user-intended input-providing gesture.

In accordance with the present invention, for example, estimating the user-specific behavioral trait of said user comprises one or more of: determining that said user typically moves the mobile electronic device at a particular direction while performing a touch gesture; determining that said user typically rotates the mobile electronic device while performing a touch gesture; determining that said user typically slants the mobile electronic device at a particular angle while performing a touch gesture.

In accordance with the present invention, for example, estimating the user-specific behavioral trait of said user comprises: determining that said user typically holds the mobile electronic device with a first hand of the user and concurrently performs an input-providing gesture with a second hand of the user.

In accordance with the present invention, for example, estimating the user-specific behavioral trait of said user comprises: determining that said user typically holds the mobile electronic device with a single hand and concurrently performs an input-providing gesture with said single hand.

In accordance with the present invention, for example, the method may comprise: based on said correlating, estimating a first user-specific behavioral trait of said user which corresponds to a first usage scenario; based on said correlating, estimating a second user-specific behavioral trait of said user which corresponds to a second usage scenario; based on the first and second user-specific behavioral traits, differentiating between said user and another user.

In accordance with the present invention, for example, the method may comprise: based on said correlating, estimating a first user-specific behavioral trait of said user which corresponds to a first usage scenario in which said user operates said mobile electronic device while the user holds said mobile electronic device; based on said correlating, estimating a second user-specific behavioral trait of said user which corresponds to a second usage scenario in which said user operates said mobile electronic device while the user does not hold said mobile electronic device; based on the first and second user-specific behavioral traits, differentiating between said user and another user.

In accordance with the present invention, for example, a mobile electronic device may be configured to confirm identity of a user of said mobile electronic device; the mobile electronic device comprising: a touch-screen to receive touch data; an accelerometer to receive acceleration data; a correlator module to correlate between the touch data and the acceleration data; a trait extractor module to generate a user-specific trait indicative of said user, based on correlation between the touch data and the acceleration data.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF THE PRESENT INVENTION

Figure 1:
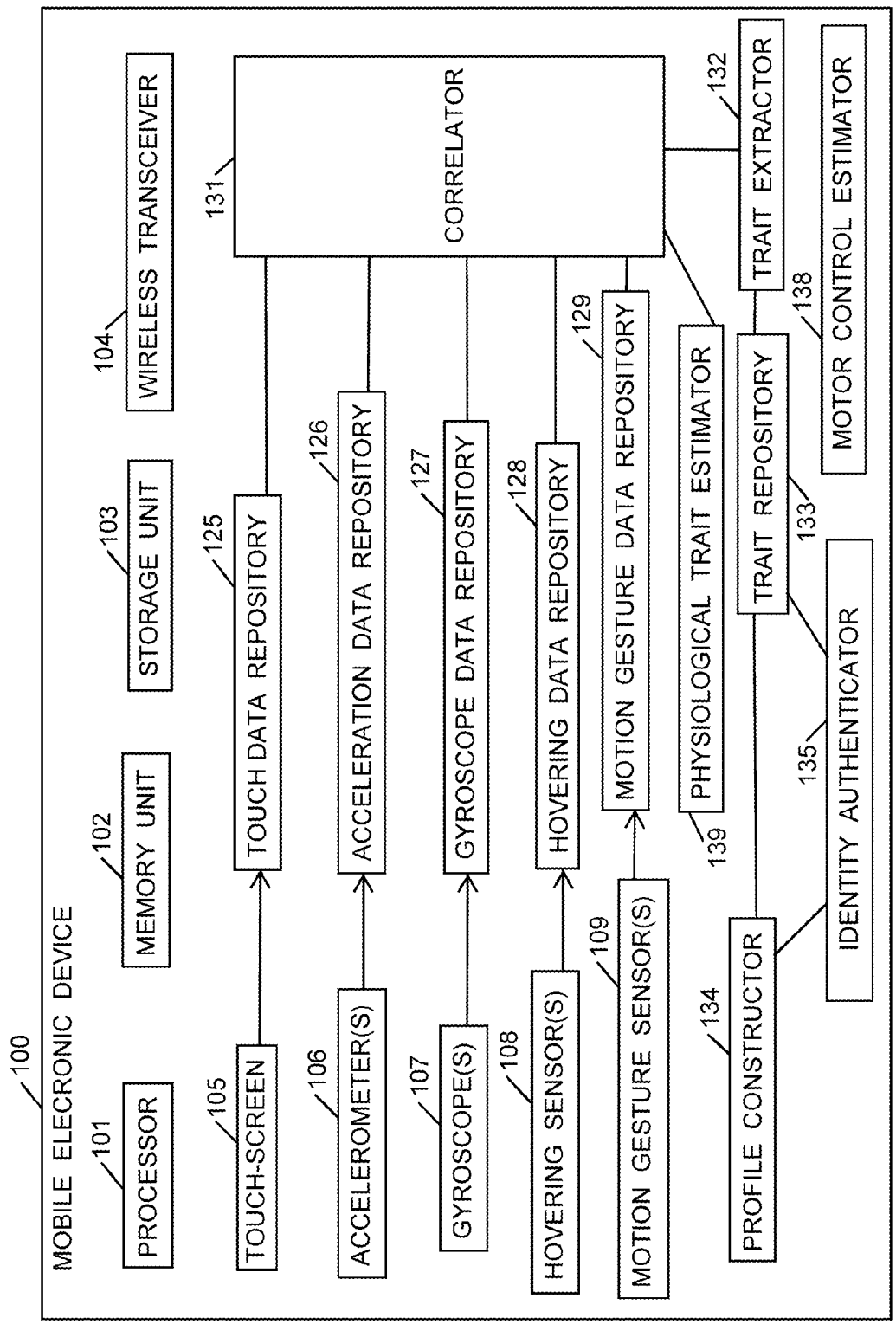
FIG. 1 is a schematic block diagram illustration of a mobile electronic device, in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that each user of a mobile electronic device may handle the device in a unique manner which may be detected and may be utilized for confirming the identity of the user, or for other security-related purposes or fraud-detection purposes. Applicants have realized, for example, that different users cause different type of acceleration to the mobile device when they perform the same operation or touch-gesture (e.g., swiping or tapping or scrolling on the touch-screen), or may tilt or rotate or slant the mobile device in different, unique ways when they perform such gestures or operations.

The present invention may include, for example, biometric modalities, personal trait extraction modalities, and/or identity authentication modalities which may be used in conjunction with a mobile or portable electronic device, and may utilize a combination of (or correlation between) acceleration parameters and/or touch data. Such parameters may be used in order to deduce unique insights regarding the identity or possible identity of the user of the mobile electronic device, or in order to determine whether or not the user is considered to be the "genuine" user, or in contrast, an attacker or impersonator or "fraudster".

The present invention may capture, monitor, or otherwise utilize for deduction of insights, the coupling or correlation between (a) touch-screen interaction, or other user gestures, and (b) accelerometer(s) measurements and/or gyroscope(s) measurements. The present invention may further deduce and/or utilize one or more other biometric traits or identity-authentication traits, for example, touch or swipe locations, pressure dynamics, identification of physiological regions (e.g., in the hand of the user) that move while other regions do not move when a user gesture is performed, or other suitable traits in order to assist in identification and/or authentication of the user of the mobile device.

The present invention may sufficiently capture unique qualities of a human user to be usable as a biometric for authentication. Different people may have different preferred orientations for holding or grasping (e.g., in their hand) a mobile device, and/or a different way in which they press or touch or tap the touch-screen (e.g., the applied force, the duration of the tapping, or the like).

Applicants have realized that physical traits such as, for example, hand size, hand mass, or other traits, may change the way in which a user's interacting hand and his device-holding hand are correlated. In a demonstrative example, the present invention may distinguish or differentiate between (a) a person who is using one single hand for both holding the mobile device and tapping on its touch-screen (or performing other touch gesture), and (b) a person who is using one hand to hold the mobile device and another hand to tap on its touch-screen (or to perform other touch gesture or user gesture).

Moreover, as Applicants have realized, different tap locations (e.g., top-left corner or region of the touch-screen, versus bottom-right corner or region) may create different torque(s) on the mobile device, further depending on the tap strength, the offset of the mobile device in the hand (e.g., the device being held high or low, with the palm area or the fingers area, or the like) and/or the size of the hand (e.g., if the same hand is used for both holding the device and tapping on its touch-screen).

The terms "mobile device" or "mobile electronic device" as used herein may include, for example, a smartphone, a cellular phone, a mobile phone, a tablet, a handheld device, a portable electronic device, a portable gaming device, a portable audio/video player, or the like.

The term "genuine user" as used herein may include, for example, an owner of a mobile electronic device; a legal or lawful user of a mobile electronic device; an authorized user of a mobile electronic device; a person who has legal authorization and/or legal right to utilize a mobile electronic device, for general purpose(s) and/or for one or more particular purpose(s); or the person who had originally defined user credentials (e.g., username and password) for performing an activity through the mobile electronic device.

The term "fraudulent user" as used herein may include, for example, any person who is not the "genuine user" of the mobile electronic device; an attacker; an intruder; a man-in-the-middle attacker; a man-in-the-browser attacker; an unauthorized user; an impersonator; a hacker; a cracker; a person attempting to hack or crack or compromise a security measure utilized by the mobile electronic device or utilized by an activity or service accessible through the mobile electronic device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The term "user gesture" as used herein may include, for example, a gesture or movement or other operation that a user of a mobile device performs on a touch-screen of the mobile device, or performs in proximity to the touch-screen of the mobile device; touch gesture; tap gesture or double-tap gesture or prolonged tap gesture; scroll gesture; drag gesture, or drag-and-drop gesture; release gesture; click or double-click gesture; hovering gestures, in which the user may hover with his finger(s) or hand(s) in proximity to the touch-screen of the mobile device but without necessarily touching the touch-screen device; hovering gestures that may be captured by a camera of the mobile device, or by a touch-screen of the mobile device (e.g., by taking into account electrical and/or magnetic effects of such gestures); hovering gestures which may be generally similar to touch-free hovering gestures that a Samsung Galaxy S4 smartphone is able to detect; finger(s) gestures and/or hand(s) gestures made in a three-dimensional space, for example, similar to movement gestures that a Microsoft Kinect motion sensing input device is able to sense; and/or a combination of such gestures or other gestures.

Reference is made to FIG. 1, which is a schematic block diagram illustration of a mobile device 100 in accordance with the present invention. Mobile device 100 may comprise, for example, a processor 101, a memory unit 102, a storage unit 103, a wireless transceiver 104, a touch-screen 105, one or more accelerometers 106, and one or more gyroscopes 107. Mobile device 100 may further comprise, for example, one or more hovering sensors 108, one or more motion gesture sensor(s) 109, a correlator 131, a trait extractor 132, a trait repository 133, a profile constructor module 134, an identity authenticator module 135, and a physiological trait estimator 139. Mobile device 100 may comprise other suitable hardware components and/or software modules, for example, a power source (e.g., a rechargeable battery), an Operating System, software applications, or the like.

Touch-screen 105 may receive user gestures, for example, tapping, double-tapping, dragging, pressing, holding down, releasing, scrolling, pinching fingers for zoom-out, spreading fingers for zoom-in, or the like). Touch data may be stored in a touch data repository 125, optionally in association with a time-stamp associated with each touch data-item being stored.

Accelerometer(s) 106 may comprise, for example, a three-axis accelerometer able to measure acceleration, separately, along three axes (X axis, Y axis, Z axis). Accelerometer readings may be stored in an acceleration data repository 126, optionally in association with a time-stamp associated with each acceleration data-item being stored.

Gyroscope(s) 107 may comprise, for example, a three-axis gyroscope able to measure orientation and/or rotation, e.g., separately along three axes (X axis, Y axis, Z axis). The measured data may be stored in a gyroscope data repository 127, optionally in association with a time-stamp associated with each orientation/rotation data-item being stored.

Hovering sensor(s) 108 may comprise, for example, one or more sensors (e.g., optical sensors, magnetic sensors, electric sensors, touch-screen components, camera components, or the like) able to sense hovering gesture(s) of the user of device 100, for example, in a three-dimensional space or separately along three axes (X axis, Y axis, Z axis). The measured data may be stored in a hovering data repository 128, optionally in association with a time-stamp associated with each hovering data-item being stored.

Motion gesture sensor(s) 109 may comprise, for example, one or more sensors able to sense motion gesture(s) of the user of device 100, for example, in a three-dimensional space or separately along three axes (X axis, Y axis, Z axis). The measured data may be stored in a motion gesture data repository 129, optionally in association with a time-stamp associated with each motion gesture data-item being stored.

Correlator 131 may search for, or identify or determine, correlation among (a) acceleration data and/or gyroscope data, and (b) touch data and/or hovering data and/or motion gesture data. Trait extractor 132 may determine one or more user-specific traits or characteristics which may be, or may appear to be, unique to (or indicative of) a particular user, based on one or more correlation(s) identified by correlator 131. Trait values or trait indicators, or data indicative of extracted user-specific traits, may be stored in a trait repository 133.

Profile constructor module 134 may utilize a learning algorithm to construct a user profile based on the one or more user-specific traits identified by trait extractor 132 and stored in trait repository 133. Profile construction may be performed over a pre-defined time period (e.g., five hours, or three days) of the user interacting with device 100; or over a pre-defined number of interactions (e.g., 12 or 25 or 100 interactions) of the user with device 100. Optionally, profile constructor module 134 may dynamically extend or shorten or modify the required time-period or interaction number, for example, if traits of a particular user are distinctive and are rapidly extracted over a shorter period of time or over a smaller number of user interactions. Constructed user profiles may be stored in a user profile repository, which may be internal to device 100 or may be external thereto (e.g., in a remote server or in a "cloud computing" server), optionally with an associated flag or parameter indicating whether a particular user profile is fully constructed or under construction.

Identity authenticator module 135 may capture one or more traits of a user who is currently utilizing device 100, and may analyze and determine whether or not these traits are similar to, or different from, user-specific traits in a user profile associated with a user that is believed to be a "genuine" user of device 100. The analysis results may be notified by identity authenticator module 135 to other units or modules, within device 100 (e.g., an application or process running in device 100) and/or externally to device 100 (e.g., on a remote server, on a remote web-site or web-page, in a "cloud" server or device).

For example, if the analysis indicates that the current user of device 100 is not the genuine user, then, one or more fraud-stopping operations or additional authentication operations may be triggered and performed, for example, requiring the user to re-enter his password or pass-phrase or Personal Identification Number (PIN), requiring the user to answer one or more security questions, requiring the user to perform log-in operations or to provide account details (e.g., to provide date-of-birth data), requiring the user to place a phone call to a fraud department or a security department of a service or entity associated with an application running on device 100; blocking or restricting or curtailing access of the user to one or more services or features which may be generally available through device 100; or the like.

Correlator 131 may identify user-specific physiological correlations. For example, correlator 131 may identify one or more geometric place(s), on touch-screen 105 or in a space proximate to touch-screen 105, in which a user gesture is associated with movement of a user body part (e.g., the thumb; one or more fingers; the palm or wrist) while also being associated with rest or non-movement of other body parts of the user. Based on the user-specific physiological correlations, trait extractor 132 may extract user-specific physiological trait(s).

In a demonstrative example, trait extractor 132 may determine that for the user Adam, a vertical scroll-down touch-gesture is typically associated with movement of the root of the thumb, while the other fingers are at rest and while the wrist or palm-base are at rest; whereas, for the user Bob, a vertical scroll-down touch-gesture is typically associated with both movement of the root of the thumb, as well as with slight rotational movement of fingers that hold or support the rear of the mobile device, and while the wrist or palm-base are at rest. This may be subsequently used for user authentication or for identity confirmation, to distinguish between a "genuine" user (e.g., Adam) and a fraudulent user or non-genuine user (e.g., Bob) when the user of device 100 performs a similar user gesture.

In another demonstrative embodiment, correlator 131 may determine that the user of device 100 (e.g., the "genuine" user), while performing a primary gesture or an intended gesture (e.g., required in order to provide user input to device 100), typically also performs a secondary gesture an inadvertent gesture (e.g., not required in order to provide user input to device 100). For example, the primary gesture may be a scrolling gesture, a zoom-in or zoom-out gesture, a dragging gesture, a tapping gesture, or other user input gesture; whereas, the secondary gesture (e.g., the inadvertent or unintended gesture, to which the user may not even be aware) may be, for example, slight or significant rotating or spinning of device 100, slight or significant movement of device 100 (e.g., in a particular direction), slight or significant tilting or slanting of device 100 (e.g., at a particular angle or range-of-angles), or the like.

In another demonstrative embodiment, correlator 131 may be associated with, or may operate in conjunction with, physiological trait estimator 139 which may be able to indirectly estimate one or more physiological traits or physiological characteristics of the user of device 100, and particularly, of the hand(s) or finger(s) (e.g., a finger, a thumb, or the like) of that user. For example, physiological trait estimator 139 may estimate a width of a finger or thumb based on a width of a swiping trace performed by the finger on touch-screen 105; may estimate a length of a finger or thumb based on a radius of a circular or arched or curved swiping motion on touch-screen 105; may estimate the distance between the tip of a finger or thumb and the palm of the hand, or the wrist; may estimate other dimensions of hand-parts, or relations between such hand parts; or the like. Physiological trait estimator 139 may thus estimate physiological characteristics which may be unique to a particular user, and may assist in confirming user identity and/or in detecting a non-genuine user impersonating the genuine user.

Additionally or alternatively, correlator 131 may be associated with, or may operate in conjunction with, a motor control estimator 138 which may estimate user-specific motor control parameters based on the user's interaction with mobile device 100. Such parameters may include, for example, parameters of the action-perception loop modeling the hand-eye coordination, as well as control loop parameter, motor noise, perception noise, or the like. Motor control estimator 138 may estimate user-specific parameters of motor control, which may be more inherent to the user and may be less action-dependent.

In a demonstrative implementation, for example, motor control estimator 138 may track a user gesture on the touch-screen (e.g., a scroll or swipe gesture). The movement or gesture may begin at rest in a start-point $(X_0, Y_0)$, and may end at rest in an end-point $(X_1, Y_1)$. A demonstrative control loop of the second order, for example, may assume that the force of the hand is governed by a linear combination of two error terms: a translation error, and the current velocity error.

The translation error may be represented as:

$$\Delta x = (x_1 - x(t))$$

The current velocity error may be represented as:

$$\Delta v_x = \frac{d}{dt} x(t)$$

The control loop may be represented (for the X-axis, and similarly and separately also for the Y-axis) as:

$$\frac{d^2x(t)}{dt^2} = \alpha_x \Delta x + \beta_x v_x + n_x$$

In the last equation, $\alpha x$ and $\beta x$ are control loop parameters, and nx is motor control noise (e.g., Gaussian random variable). Accordingly, motor control estimator 138 may estimate or may simulate trajectories which may be similar to human trajectories; and although a velocity curve may be different for each movement of the same movement, the velocity curve may be generated by the same model parameters of that specific user. Motor control estimator 138 may thus estimate these three parameters (for the X-axis, and/or for the Y-axis), thereby estimating user-specific motor control traits which may be used for differentiating between a genuine user and an impersonator or attacker, regardless of the specific movement(s) or gesture(s) performed. The above is only a demonstrative example, and motor control estimator 138 may utilize other motor control estimations, forward model(s), feedback model(s), estimation of similar peak velocity (or other movement properties) for different movements (e.g., if the error terms are distorted by a non-linear function).

Additionally or alternatively, correlator 131 may identify user-specific behavioral correlations. For example, correlator 131 may identify that when a particular user performs a particular user-gesture, performance of the gesture affects in a particular way the acceleration data and/or the orientation/rotation data of device 100. Based on the user-specific behavioral correlations, trait extractor 132 may extract user-specific behavioral trait(s).

In a demonstrative example, trait extractor 132 may determine that for the user Adam, a horizontal swipe gesture is typically associated with a counter-clockwise rotation in the range of 10 to 15 degrees around a vertical axis (e.g., a rotation axis parallel to the longest dimension of device 100); whereas, for the user Bob, a horizontal swipe gesture is typically associated with a clockwise rotation in the range of 5 to 10 degrees (or, with substantially no rotation at all) around that vertical axis. This may be subsequently used for user authentication or for identity confirmation, to distinguish between a "genuine" user (e.g., Adam) and a fraudulent user or non-genuine user (e.g., Bob) when the user of device 100 performs a similar user gesture.

Correlator 131 may be configured to search for, and detect, other user-specific behavioral correlations, for example: correlations based on the manner of holding device 100 (e.g., a primary angle of holding), and the effect of various user gestures on such holding or on the primary angle of holding; correlations based on the stability or the shakiness of device 100 (e.g., optionally taking into account the amount and/or frequency and/or timing of hand vibrations or hand movements), and the effect of various user gestures on such device stability or shakiness, or on stability or shakiness of the hand of the user that holds or operates device 100; correlations based on movement, spinning, rotation and/or acceleration of device 100, along one axis or two axes or three axes, as a result of (or concurrently with) a user gesture such as, for example, tap, double-tap, prolonged tap, release, drag, drag and drop, click, double-click, rotation or movement of an on-screen object, rotation of device 100 by 90 degrees or 180 degrees or 270 degrees, horizontal or vertical or diagonal swipe gesture, scroll gesture, zoom-in or zoom-out gestures, user operations on physical buttons or sliders or interface components of device 100 (e.g., volume interface, camera button, button for capturing an image or a video), or the like.

Correlator 131 may further detect correlations based on movement, spinning, rotation and/or acceleration of device 100, along one axis or two axes or three axes, that occur prior to or subsequent to a user gesture. For example, correlator 131 may detect that a first particular user typically tilts the phone from being generally perpendicular to the ground, to being generally parallel to the ground, immediately prior to performing a zoom-out gesture (e.g., a "pinching" gesture with two fingers on touch-screen 105). Similarly, correlator 131 may detect that a second particular user typically rotates the phone counter-clockwise, immediately subsequent to performing a zoom-in gesture (e.g., spacing apart two fingers on touch-screen 105). In some implementations, for example, a correlation may be detected while the user gesture is performed, immediately before the user gesture is performed (e.g., within 0.5 seconds prior to the user gesture), and/or immediately after the user gesture is performed (e.g., within 0.5 seconds subsequent to the user gesture).

Optionally, correlator 131 may detect other suitable correlations, and may take into account other types of readings or sensed data, for example, data indicating a temperature or moisture level or sweat level which may be associated with a user gesture, data indicating the amount of pressure or force applied by a user (e.g., when pressing on touch-screen 105), or the like.

In a demonstrative example, a first user may typically scroll down with his finger on touch-screen 105 while slightly rotating the mobile device 100 around its longest axis; and a correlation may be identified between the respective touch data and acceleration/orientation data, indicative of the first user. In contrast, a second user may typically scroll down while maintaining the mobile device 100 non-rotating, or while rotating mobile device 100 at a different direction or angle, or at a different acceleration value, thereby allowing to identify a different correlation, indicative of the second user.

Optionally, the present invention may identify, create and utilize a first set of behavioral traits which correspond to the behavior of a particular user when he is utilizing his mobile device in a first holding scenario (e.g., when the user is holding the mobile device in his hand), and a second (different) set of behavioral traits which correspond to the behavior of that particular user when he is utilizing his mobile device in a second holding scenario (e.g., when the mobile device is placed on a table or flat surface and the user operates the mobile device without holding it). Accordingly, the present invention may create and utilize a behavioral profile for that user, which may comprise multiple sub-profiles of behavioral traits that correspond to such multiple usage scenarios by the same (e.g., "genuine") user. In a subsequent usage of the mobile device, the system may compare the behavioral traits of the subsequent user, to each one (e.g., separately) of the pre-stored sets of behavioral traits (or behavioral sub-profiles), in order to detect or determine whether that subsequent user is the "genuine" user operating in one of the known usage scenarios, or alternatively a fraudulent user or attacker. Similarly, the present invention may generate and/or utilize complex profiles that may comprise of sub-profiles or sets of traits (e.g., behavioral traits, physiological traits, motor control traits), such that each set or sub-profile may correspond to a particular usage scenario or a particular holding scenario of the user; and a subsequent usage may be compared, separately, to each one of those sub-profiles (or sets of traits) in order to determine user authenticity.

The terms "correlation", "correlator", "to correlate", and similar or equivalent terms which may be used herein, are used for demonstrative purpose only; they may include, for example, statistical correlation, or statistically-significant correlation, or any other type of relation or indication or matching between two parameters or between groups of values. In some embodiments, there need not be statistically-significant correlation between, for example, touch data and acceleration data, in order to identify or extract unique user trait(s); but rather, there may be other type of relation or matching between touch-data and acceleration data in order to determine such "correlation".

In accordance with the present invention, mobile device 100 may continuously track and/or monitor the correlation between touch-data and acceleration/orientation data. Correlation values may be used to determine user-specific traits, that are indicative of the user of the mobile device 100, which may be regarded initially as the "genuine" user. Then, during subsequent usage of the mobile device 100, correlation between touch-data and acceleration/orientation data may be tracked and identified, and may be compared to the correlation previously-determined for the genuine user, in order to confirm that a current user is indeed the genuine user, or in order to determine or to estimate that a current user is a non-genuine user.

In a demonstrative implementation, an application or a website may be accessible through device 100 through an access control process or a user authentication process. Such application or website may be, for example, an email account, a social network account, a video conference application, a chat application, an online banking application or website, a securities trading application or website, an electronic commerce account or website, or the like. The user may be prompted to create a new user account (e.g., define a username and password); and then, or in parallel, user-specific traits may be captured through passive means and/or active means, which may be known to the user or may be hidden from the user.

For example, a profile creation page or application may require the user to perform various touch operations (e.g., tapping, scrolling, dragging, or the like), and may capture touch data as well as acceleration/orientation data, which may then be correlated in order to identify a biometric trait indicative of the user who is currently creating the profile, or who is otherwise believed to be a genuine user (e.g., based on password entry and/or responses to security questions or other challenge-response mechanisms). Optionally, an active challenge may be posed to the user, for example, by explicitly asking the user to perform one or more particular touch gestures on touch-screen 105, either as "hidden" challenges (in which the user is not aware that he is actively challenged for security purposes) or as non-hidden challenges (in which the user is advised that, as a security measure, he is required to perform certain touch gestures in order to extract biometric traits).

Figure 5:
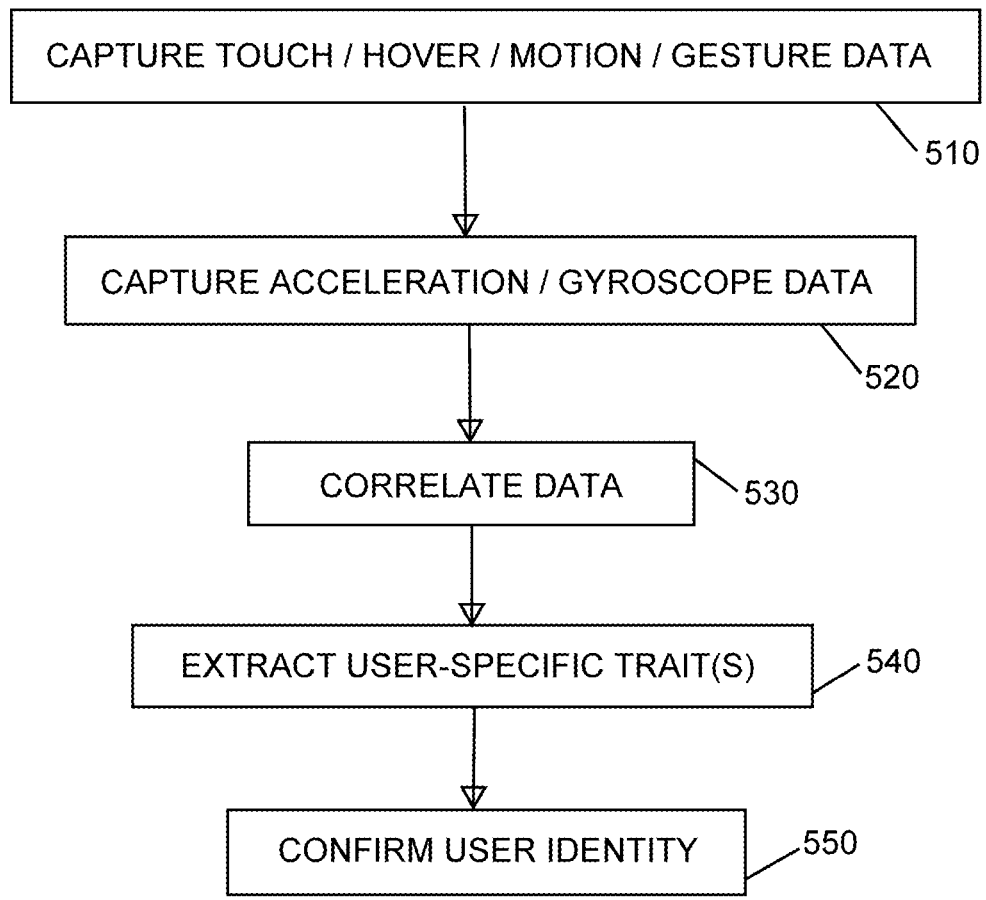
FIG. 5 is a flow-chart of a method in accordance with some demonstrative embodiments of the present invention.

Reference is made to FIG. 5, which is a flow-chart of a method in accordance with some demonstrative embodiments of the present invention. The method may be implemented by a mobile electronic device, by one or more hardware components and/or software modules of a mobile electronic device, by a system, or the like.

The method may include, for example, capturing at least one of touch data, hovering data, motion data, gesture data (block 510).

The method may include, for example, capturing at least one of acceleration data, gyroscope data, device orientation/rotation data, principal axes rotation data (e.g., normal axis or yaw, lateral axis or pitch, longitudinal axis or roll) (block 520).

The operations of block 520 may be performed simultaneously or concurrently with, or in parallel to, the operations of block 510.

The method may include, for example, correlating or matching (block 530) between the data captured in block 510 and the data captured in block 520.

The method may include, for example, extracting a user-specific trait (block 540) based on the correlating or matching of block 530. The user-specific trait may include, for example, one or more behavioral traits, physiological traits, motor control traits, or other user-specific characteristics.

The method may include, for example, subsequently, confirming user identity based on said user-specific trait (block 550).

Other suitable operations may be used in accordance with the present invention.

Some embodiments of the present invention may be utilized, or may operate, in conjunction with methods, algorithms, devices and/or systems which are described in PCT International Application Number PCT/IL2011/000907, titled "Method and Device for Confirming Computer End-User Identity", published on Jun. 7, 2012 as International Publication Number WO/2012/073233, which is hereby incorporated by reference in its entirety; and/or in U.S. patent application Ser. No. 13/877,676, filed on Apr. 4, 2013, which is hereby incorporated by reference in its entirety.

In accordance with the present invention, correlation between touch-data and acceleration/orientation data may be identified and/or checked locally in mobile device 100; or remotely, such as in a remote server which may receive such data via a wireless communication link from mobile device 100; or by using other suitable architecture, for example, a hybrid architecture in which some operations may be performed locally and other operations may be performed remotely. Accordingly, components or modules that are depicted, for demonstrative purposes, as being included in mobile device 100, may be implemented at a remote server or within other suitable units. The present invention may be implemented in a stand-alone mobile device, such that data collection and processing may be performed within device 100; or in a client-server architecture, such that device 100 may collect data and may wirelessly transmit the collected data to a remote server for processing and analysis; or in a "cloud computing" architecture in which data is stored remotely and is also processed remotely. Other suitable architectures may be used, to deploy a system in which a particular mobile device "knows" or recognizes its genuine user, or, to deploy a system in which a particular application or website "know" or recognize a genuine user, based on the above-mentioned correlations.

In a demonstrative experiment in accordance with the present invention, multiple participants were asked to hold a particular mobile device (an iPad tablet), to drag (with a finger) a displayed green circle towards a displayed red target, and then to release the dragged item once it reached the red target. Accelerometer data and touch data were collected while performing the requested operations.

Figure 2:
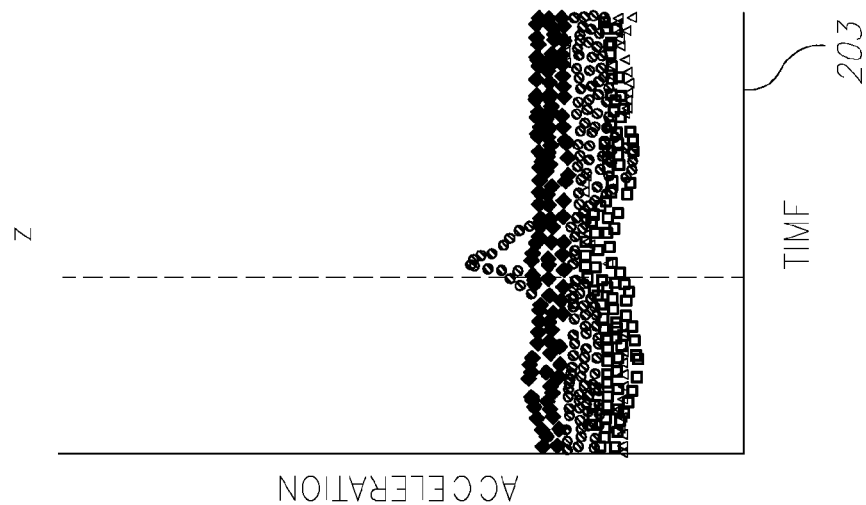
FIG. 2 is an illustration of three graphs, which demonstrate acceleration as a function of time over three separate axes, in accordance with some demonstrative embodiments of the present invention.
Figure 2:
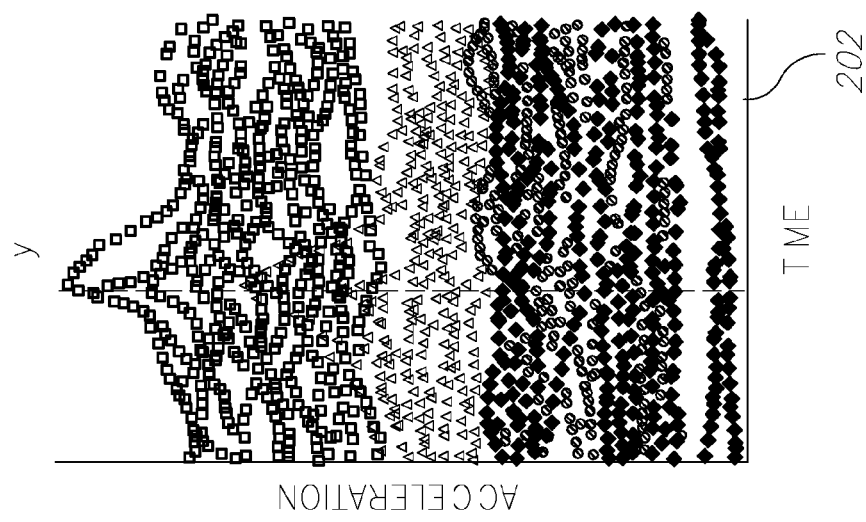
Figure 2:
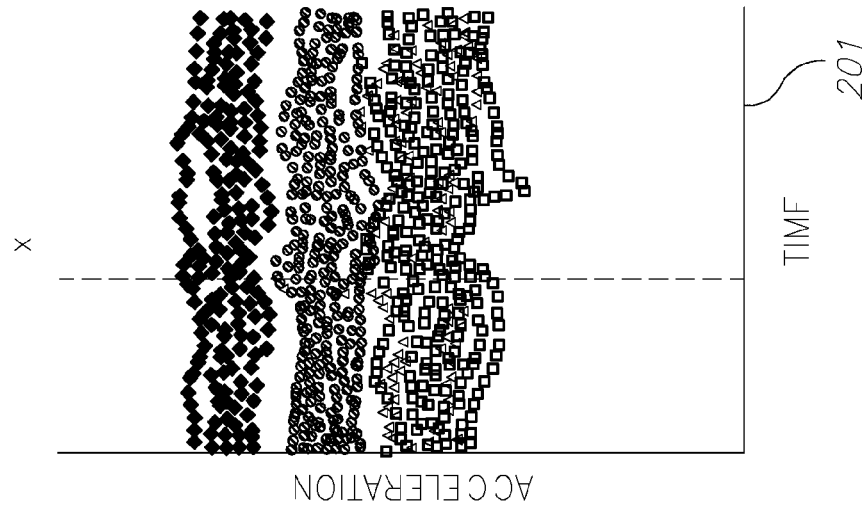

The experiment measured the touch and release signals, as well as accelerometer measurements; and then triggered the acceleration data according to the touch time. FIG. 2 depicts three graphs 201-203, which demonstrate acceleration as a function of time over three separate axes, thereby demonstrating at least two identifying characteristics which may be used as a user-specific trait. As a first identifying characteristic, the phasic level (observed at the X axis) may have different values for different people, corresponding to different posture of the mobile device. As a second identifying characteristic, the transient shape once the device is clicked (observed at the Z axis) may have different values for different people. This data may be transformed or analyzed, for example, by using dimension reduction techniques (e.g., kernel-principle-component-analysis), thereby demonstrating the biometric capability of synergizing between touch data and acceleration data.

Figure 3:
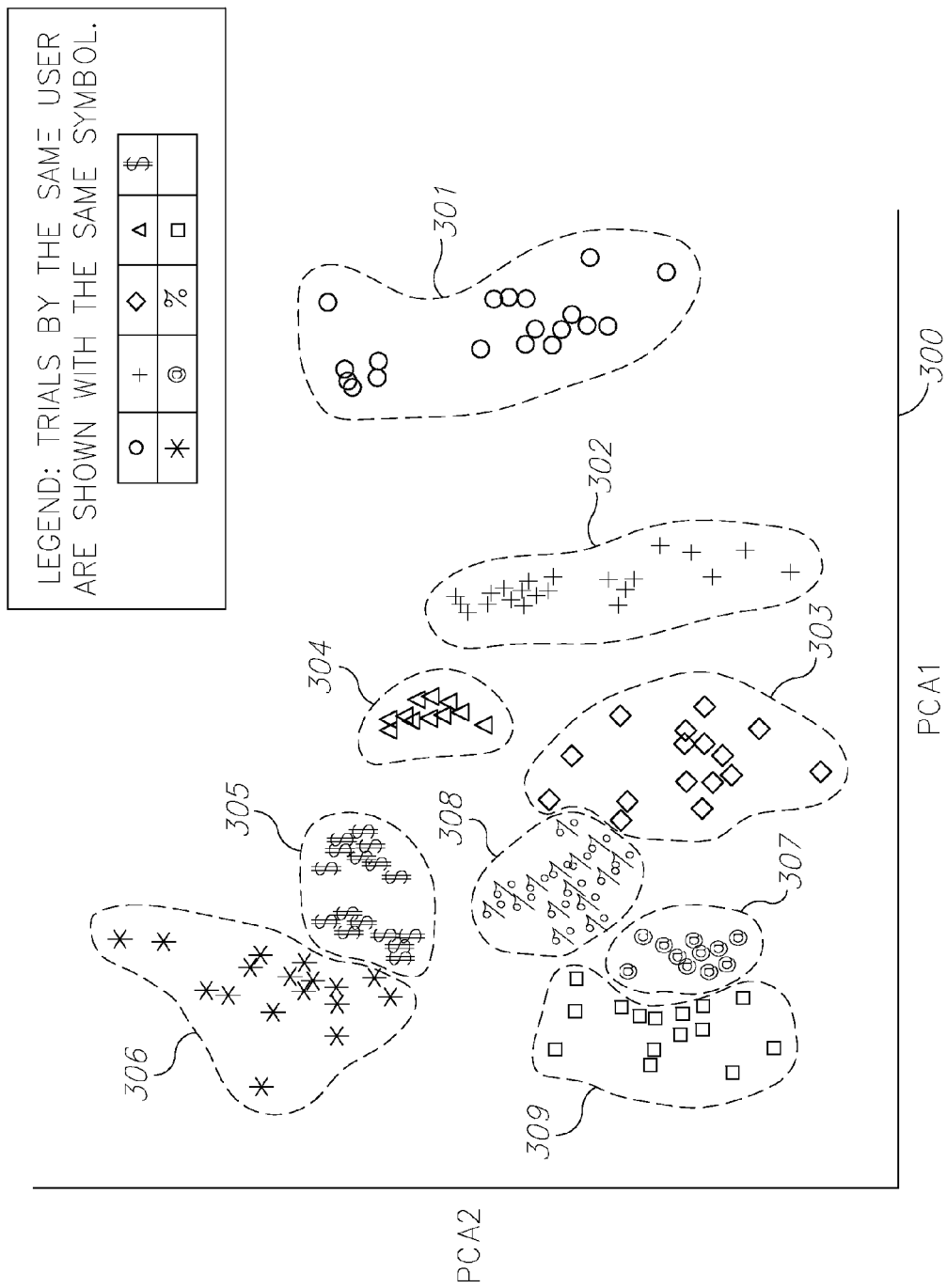
FIG. 3 is an illustration of a graph of the main axes of dimension-reduced space of accelerometer reaction to tapping, in accordance with some demonstrative embodiments of the present invention.

Reference is made to FIG. 3, which demonstrates a graph 300 of the main axes of the dimension-reduced space of the accelerometer reaction to tapping. Each small item in graph 300 represents one trial, and each shape or character in graph 300 (e.g., circle, square, diamond, triangle) represents a different user. This drawing demonstrates identifiable clusters 301-309 of trials, each such cluster corresponding to a different user.

Figure 4:
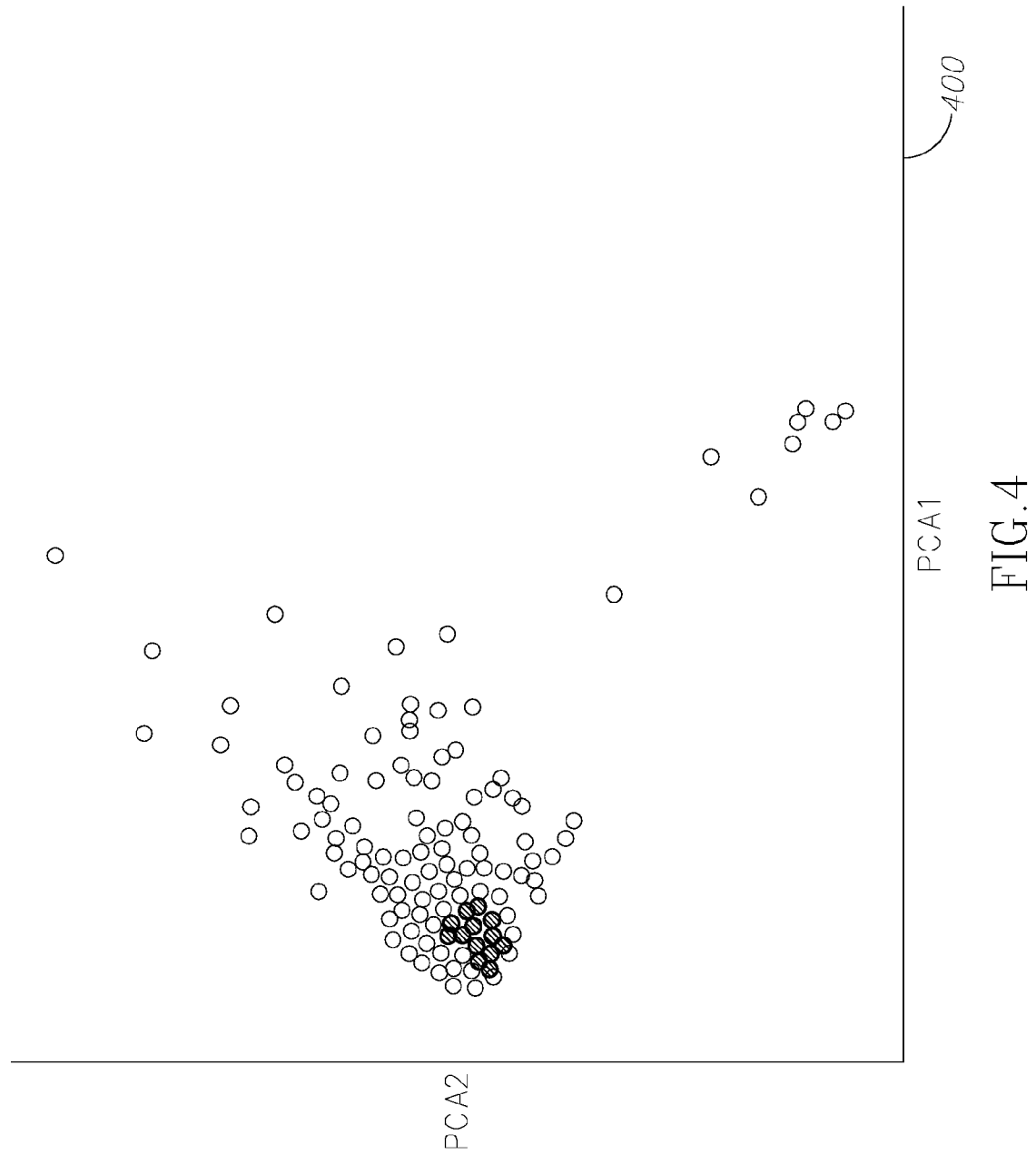
FIG. 4 is an illustration of a graph depicting feature space, in accordance with some demonstrative embodiments of the present invention.

In certain scenarios, posture data (e.g., phasic response) may be neglected or may not be available, for example, if the mobile device is operated while being placed on a table or a flat surface and is not hand-held by the user. In such scenarios, only the device's kinematics during taps may be taken into account, and still the present invention may capture sufficient information for biometric functions. Reference is made to FIG. 4 which illustrates a graph 400 depicting the feature space, where each dot represents a trial; greyed circles represent trials performed by one particular user, and black circles represent trials performed by the other participants. This drawing demonstrates dimension reduction when only the device's kinematics are taken into account, showing that, still, sufficient significant biometric information may be captured and determined.

The present invention may be used in order to automatically identify that a user (e.g., an attacker or a "fraudster") is attempting to pose as (or impersonate, or "spoof") another user (e.g., the "real" user or the genuine user). In accordance with the present invention, the attacker would need to carefully and correctly imitate the exact accelerometer response for tapping (or for other suitable touch-screen operations, such as scrolling, dragging, releasing), taking into account the particular kinematics properties of the genuine user; and such imitation may be extremely difficult and unlikely, or even impossible, for most attackers.

The present invention may utilize signal processing and/or machine learning techniques, in order to build or generate a template model or a profile which corresponds to the genuine user; and then compare subsequent instance(s) or sample(s) to the pre-built (and locally stored, or remotely stored) model or profile. If the subsequent samples are consistent with the pre-built model or profile, then a first output score may be generated (e.g., having a high value in a predefined numeric range, such as a value of 98 on a scale of 0 to 100); whereas, if the subsequent samples are inconsistent with the pre-built model or profile, then a second output score may be generated (e.g., having a lower value on the predefined numeric range, such as a value of 34 on the scale of 0 to 100). In some implementations, an output score greater than a threshold value may be used (alone, or in combination with other biometric traits and/or other authentication measures) as an indication that the current user is the genuine user; whereas an output score lower than the threshold value may be used (alone, or in combination with other biometric traits and/or other authentication measures) as an indication that the current user is not the genuine user.

The present invention may further be used to differentiate or distinguish between the genuine (human) user, and a robot or a machine-operable module or function (e.g., implemented as a computer virus, a Trojan module, a cyber-weapon, or other malware) which attempts to automatically imitate or emulate or simulate movement of a cursor or other interaction with a touch-screen. For example, false identity created by automated malware may be detected by the present invention as such automated malware may lack the characterization of human (e.g., manual) behavior, such as the touch features (e.g., speed, pressure) and/or its accelerometer correlated measurements.

The present invention may operate and may provide an efficient biometric or user-authentication modality, without capturing, storing, or otherwise identifying any Personally Identifiable Information (PII). For example, the present invention may be used to distinguish between a genuine user and a fraudster, without knowing any PPI of the genuine user and/or of the fraudster.

The present invention may detect correlations and extract user-specific traits based on passive data collection and/or based on active challenges. In passive data collection, the mobile device may detect that the user is performing a particular operation (e.g., a vertical scroll gesture), and may further detect that performing this gesture affects in a user-specific way the acceleration and/or the orientation/rotation of the mobile device. In an active challenge, the mobile device (or an application or process thereof) may actively present a challenge to the user, such as, a requirement to the user to perform horizontal scrolling, in order to capture data and detect user-specific correlation(s). The active challenge may be hidden or may be unknown to the user, for example, implemented by creating a Graphical User Interface (GUI) that requires the button to scroll in order to reach a "submit" button or a "next" button or a "continue" button, thereby "forcing" the user to unknowingly perform a particular user-gesture which may be useful for correlation detection or for extraction of user-specific traits, as described. Alternatively, the active challenge may be known to the user, and may be presented to the user as an additional security feature; for example, by requesting the user to drag and drop an on-screen object from a first point to a second point, as an action that may be taken into account for confirming user identity.

Some embodiments of the present invention may be implemented, for example, as a built-in or integrated security feature which may be a component or a module of a mobile device, or may be a downloadable or install-able application or module, or plug-in or extension; or as a module of a web-site or web-page, or of a client-server system or a "cloud computing" system; or as machine-readable medium or article or memory unit able to store instructions and/or code which, when executed by the mobile device or by other suitable machine (e.g., a remote server, or a processor or a computer) cause such machine to perform the method(s) and/or operations described herein. Some units, components or modules, that are shown in FIG. 1 for demonstrative purposes as comprised within mobile device 100, may be implemented externally to mobile device 100, may be implemented in a remote server, a web server, a website or webpage, a "cloud computing" server or database, a client/server system, a distributed system, a peer-to-peer network or system, or the like.

In some embodiments of the present invention, the analysis or correlation or matching (e.g., between accelerometer/gyroscope data, and touch-data or hovering data or other user-gesture data) may be location-based and/or application-based, or may otherwise take into account a geographical location or geo-spatial location of the mobile device or the application(s) being used or that are installed on the device. In a demonstrative example, a suitable module (e.g., a location-aware module or location-determining module) in the mobile device may determine the current location of the mobile device, based on GPS data or Wi-Fi data or cellular triangulation data or mobile network cell data or other location-identification techniques. The mobile phone may then utilize a suitable module (e.g., a correlator or matching module between location and user-specific behavioral usage traits) in order to deduce or determine, for example: that when the user utilizes his mobile device in a first location (e.g., in his office), then the mobile phone is typically placed horizontally on a flat surface (e.g., a table); that when the user utilizes his mobile phone in a second location or type of location (e.g., outdoor, on the street, in the park), then the mobile phone is typically held by the hand of the user at a slanted angle or diagonally (e.g., at approximately 45 to 60 degrees relative to the ground); that when the user utilizes his mobile phone in a third location or type of location (e.g., at a Point-Of-Sale (POS) terminal or register or cashier, at a supermarket or a retail store), then the mobile phone is typically held generally horizontally by the hand of the user (e.g., generally parallel to the ground); that when the user utilizes his mobile phone in a fourth location or type of location (e.g., at an Automatic Teller Machine (ATM) or a vending machine), then the mobile phone is typically held generally vertically by the hand of the user (e.g., at an angle of approximately 90 degrees, or between 80 to 100 degrees, relative to the ground); or the like. These determinations may be location-based or location-aware, thereby triangulating or crossing among three dimensions, namely, behavioral user-specific traits (e.g., holding the phone diagonally), gesture data (e.g., performing a scroll-down gesture), and location data (e.g., when utilizing the phone at a retailer); and such determinations may be part of the user-specific profile of that user. In a subsequent usage of the mobile device, similar determinations may be made, in order to analyze whether or not a current user is indeed the same user as in previous usage session(s) or is a "genuine" user. In a demonstrative example, this three-prone approach may raise an alert if, for example, typically the user of the mobile device holds his mobile device horizontally when performing a scroll-operation at a Point of Sale terminal; and in a subsequent usage session of the mobile device, a user holds that phone vertically when performing a scroll-operation at such Point of Sale terminal, thereby indicating that the subsequent user may not be the genuine or authorized user of the mobile device. In some embodiments, these multi-prone determinations may further be augmented with, or matched or correlated with, application-specific data or application-specific determinations, in order to improve the tailoring of the behavioral traits to the specific user. For example, the mobile device may differentiate and determine that the genuine user typically holds the phone vertically (e.g., anywhere, or in a particular location or type of location) when utilizing the camera application of the mobile device, but typically holds the phone horizontally (e.g., anywhere, or in that particular location or type of location) when utilizing the address book application of the mobile device; and these user-specific traits may be extracted and subsequently compared to data captured in a subsequent usage session of that mobile device, to authenticate user identity.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method for confirming identity of a user of a smartphone, the method comprising:
    receiving touch data from a touch-screen of the smartphone;
    receiving acceleration data from an accelerometer of the smartphone;
    correlating between the touch data and the acceleration data;
    based on the correlating, generating a user-specific trait indicative of said user of said smartphone;
    storing, either locally within said smartphone or on a remote server, a reference value of the user-specific trait, indicative of said user of said smartphone;
    in a subsequent usage session of the smartphone, generating and storing a current value of the user-specific trait correlating between touch data and acceleration data; and
    based on a comparison process between (A) the current value of the user-specific trait that was generated, and (B) the reference value of the user-specific trait that was previously generated, determining whether or not a current user of the smartphone is an authorized user of the smartphone.

2. The method of claim 1, wherein said touch data comprises non-tactile touch data indicating a hovering user gesture in proximity to said touch-screen of said smartphone.

3. The method of claim 1, comprising:
    receiving gyroscope data from a gyroscope of the smartphone;
    correlating between the touch data and the gyroscope data and the acceleration data;
    based on the correlating between the touch data and the gyroscope data and the acceleration data, generating another user-specific trait indicative of said user.

4. The method of claim 1, wherein the method comprises:
    based on the correlation between the touch data of said smartphone and the acceleration data of said smartphone, (A) determining that a first physiological region of said user moves when a particular gesture is performed, and (B) determining that a second physiological region of said user does not move when said particular gesture is performed;

based on said two determining operations, differentiating among multiple users.

5. The method of claim 1, wherein the method comprises:
determining by said smartphone, an offset of holding said smartphone in a hand of said user, wherein the offset comprises an offset selected from the group consisting of: the smartphone being held with a palm area of the hand, and the smartphone being held with a fingers area of the hand;
based on said offset of holding the smartphone in the hand, differentiating among multiple users.

6. The method of claim 1, wherein the method comprises:
determining by said smartphone, whether (A) the same hand of the user is utilized for both holding the smartphone and tapping the touch-screen of the smartphone, or (B) a first hand of the user is utilized for holding the smartphone and a second hand of the user is utilized for tapping the touch-screen of the smartphone;
based on said determining, differentiating among multiple users.

7. The method of claim 1, wherein the method comprises:
constructing a user-specific profile based on said touch data and said acceleration data, wherein the constructing is performed over a pre-defined time-period;
dynamically shortening the pre-defined time period for constructing said user-specific profile if one or more identified traits of said user are distinctive.

8. The method of claim 1, wherein the method comprises:
constructing a user-specific profile based on said touch data and said acceleration data, wherein the constructing is performed within a constraint selected from the group consisting of: (A) a pre-defined time-period, and (B) a pre-defined number of user interactions;
dynamically modifying said constraint for constructing said user-specific profile, based on distinctiveness of one or more traits of said user;
storing a flag indicating whether said user-specific profile is either (i) under construction, or (b) fully constructed.

9. The method of claim 1, wherein the method comprises:
constructing a user-specific profile which indicates that for a user-gesture that is performed at a particular geometric place of the touch-screen of said smartphone, a first body part of the user is moving while a second body part of the user is at rest;
based on said user-specific profile, differentiating among multiple users.

10. The method of claim 1, wherein the method comprises:
constructing a user-specific profile which indicates that for a scrolling gesture that is performed on the touch-screen of said smartphone, a first hand-region of the user is moving while a second hand-region of the user is at rest;
based on said user-specific profile, differentiating among multiple users.

11. The method of claim 1, wherein the method comprises:
analyzing touch-data of a swipe gesture performed by the user on the touch-screen of said smartphone, to determine an estimated width of a finger of said user;
constructing a user-specific profile which comprises said estimated width of the finger of the user;
based on said user-specific profile, differentiating among multiple users.

12. The method of claim 1, wherein the method comprises:
analyzing touch-data of a swipe gesture performed by the user on the touch-screen of said smartphone, to determine an estimated width of a finger of said user;
constructing a user-specific profile which comprises said estimated width of the finger of the user;
based on said user-specific profile, differentiating among multiple users.

13. The method of claim 1, wherein the method comprises:
analyzing touch-data of a circular swipe gesture performed by the user on the touch-screen of said smartphone, to determine an estimated distance between (A) a tip of a swiping finger of a hand of said user, and (B) a palm of said hand of said user;
constructing a user-specific profile which comprises said estimated distance between the tip of the swiping finger and the palm of the hand;
based on said user-specific profile, differentiating among multiple users.

14. The method of claim 1, wherein the method comprises:
analyzing touch-data of generally-straight swipe gestures performed by user on the touch-screen of said smartphone;
determining that a first user typically rotates the smartphone clockwise while performing generally-straight swipe gestures;
determining that a second user typically rotates the smartphone counter-clockwise while performing generally-straight swipe gestures;
based on said determinations, differentiating among said first and second users.

15. The method of claim 1, wherein the method comprises:
analyzing said touch data and said acceleration data of said smartphone, to determine a level of shakiness of the smartphone while the user operates said smartphone;
analyzing said touch data and said acceleration data of said smartphone, to determine an effect, of a performed user-gesture, on said level of shakiness of the smartphone;
constructing a user-specific profile which comprises an indication of the effect of the performed user-gesture on the level of shakiness of the smartphone;
based on said user-specific profile, differentiating among multiple users.

16. The method of claim 1, wherein the method comprises:
analyzing said touch data and said acceleration data of said smartphone, to determine that immediately prior to performing an on-screen zoom gesture, the user of the smartphone modifies a tilt angle of the smartphone relative to ground;
constructing a user-specific profile which comprises an indication that immediately prior to performing on-screen zoom gestures, the user of the smartphone modifies the tilt angle of the smartphone relative to ground;
based on said user-specific profile, differentiating among multiple users.

17. The method of claim 1, wherein the method comprises:
sensing by said smartphone a sweat level of the user while the user performs a gesture on said smartphone;
correlating between the sensed sweat level of the user and at least one of: said touch data of the smartphone, and said acceleration data of said smartphone;
based on said correlating, differentiating among multiple users.

18. The method of claim 1, wherein the method comprises:
sensing by said smartphone a temperature of a body part of the user while the user performs a gesture on said smartphone;
correlating between the sensed temperature and at least one of: said touch data of the smartphone, and said acceleration data of said smartphone;
based on said correlating, differentiating among multiple users.

19. The method of claim 1, wherein the method comprises:
sensing by said smartphone an amount of pressure of a body part of the user while the user performs a gesture on said smartphone;
correlating between the sensed amount of pressure and at least one of: said touch data of the smartphone, and said acceleration data of said smartphone;
based on said correlating, differentiating among multiple users.

20. The method of claim 1, wherein the method comprises:
determining a current location of the smartphone;
correlating between (A) the current location of the smartphone, and (B) said touch data of the smartphone, and (C) said acceleration data of said smartphone;
based on said correlating, differentiating among multiple users.

21. The method of claim 1, wherein the method comprises:
determining geographic location of the smartphone;
correlating between (A) the current location of the smartphone, and (B) said touch data of the smartphone, and (C) said acceleration data of said smartphone;
based on said correlating, (a) determining that a first user, typically places the smartphone horizontally on a flat surface when utilizing the smartphone in a first geographic location, and (b) determining that said first user, typically holds the smartphone slanted relative to the ground when utilizing the smartphone in a second geographic location;
based on said determinations, differentiating among the first user and another user.

22. The method of claim 1, wherein the method comprises:
determining a currently-used application of the smartphone, that the user is currently utilizing on said smartphone;
correlating between (A) the currently-used application of the smartphone, and (B) said touch data of the smartphone, and (C) said acceleration data of said smartphone;
based on said correlating, differentiating among multiple users.

23. The method of claim 1, wherein the method comprises:
determining a currently-used application of the smartphone, that the user is currently utilizing on said smartphone;
correlating between (A) the currently-used application of the smartphone, and (B) said touch data of the smartphone, and (C) said acceleration data of said smartphone;
based on said correlating, (a) determining that a first user typically utilizes the smartphone vertically when utilizing a first particular application of the smartphone, and (b) determining that said first user typically holds the smartphone slanted relative to the ground when utilizing a second particular application of the smartphone;
based on said determinations, differentiating among multiple users.

24. The method of claim 1, wherein the method comprises:
determining whether a current location of the smartphone is outdoors or indoors;
correlating between (A) the current location of the smartphone being either outdoors or indoors, and (B) said touch data of the smartphone, and (C) said acceleration data of said smartphone;
based on said correlating, differentiating among multiple users.

25. A method for confirming identity of a user of a tablet, the method comprising:
receiving touch data from a touch-screen of the tablet;
receiving acceleration data from an accelerometer of the tablet;
correlating between the touch data and the acceleration data;
based on the correlating, generating a user-specific trait indicative of said user of said tablet;
storing, either locally within said tablet or on a remote server, a reference value of the user-specific trait, indicative of said user of said tablet;
in a subsequent usage session of the tablet, generating and storing a current value of the user-specific trait correlating between touch data and acceleration data; and
based on a comparison process between (A) the current value of the user-specific trait that was generated, and (B) the reference value of the user-specific trait that was previously generated, determining whether or not a current user of the tablet is an authorized user of the tablet.

* * * * *